Sept. 1, 1953 G. A. FINK 2,651,019

PHOTOELECTRIC FEEDBACK OPERATED AMPLIFIER

Filed June 13, 1950

INVENTOR.
GEORGE A. FINK

BY A. John Michel

ATTORNEY

Patented Sept. 1, 1953

2,651,019

UNITED STATES PATENT OFFICE 2,651,019

PHOTOELECTRIC FEEDBACK OPERATED AMPLIFIER

George A. Fink, Dayton, Ohio

Application June 13, 1950, Serial No. 167,797

6 Claims. (Cl. 323—21)

The present invention relates generally to amplifiers, and more particularly to amplifiers capable of amplifying D. C. or very low frequency A. C. signals.

Direct coupled amplifiers now in common use for amplifying D. C. or very low frequency A. C. signals are subject to "zero shift" or, in other words, a shift of the output reference potential. This is not particularly objectionable where readings are taken at certain intervals and the reference voltage can be adjusted before each reading is recorded. However, where it is desirable to obtain a continuous accurate amplified output such as for control purposes, for example, a shift of the reference potential cannot be tolerated.

In the past, the objectionable zero shift of the conventional direct coupled amplifiers has been avoided by modulating an A. C. source of a suitable frequency with the D. C. signal or by simply "chopping" the D. C. signal and then using conventional capacitance coupled amplifiers for amplifying the modulated signal. It is contemplated by the present invention to provide simple and inexpensive means for continuously amplifying D. C. or very low frequency A. C. signals whereby the disadvantages of amplifiers now in common use are overcome.

Accordingly, one of the objects of the present invention is to provide novel and simple means for amplifying D. C. and very low frequency A. C. signals.

Another object is to provide a novel D. C. current amplifier which is not subject to zero shift.

Another object is to provide a novel amplifier for amplifying D. C. signals by utilizing electro-mechanical means for controlling current flow in an output circuit adapted to develop a voltage in opposition to the input signal.

Still another object of the invention is to provide a novel direct current or low frequency alternating current amplifier utilizing a feedback resistor in the input circuit and including means for varying the current in the output circuit in response to the current flowing in the input circuit until the voltage developed across the feedback resistor substantially balances the signal voltage.

The foregoing and other objects and advantages will appear more fully hereinafter from the detailed description which follows, taken together with the accompanying drawing wherein two embodiments of the invention are illustrated by way of example. It is to be understood, however, that the drawing is for the purpose of illustration and description only, and is not intended as a definition of the limits of the invention.

Figure 1:
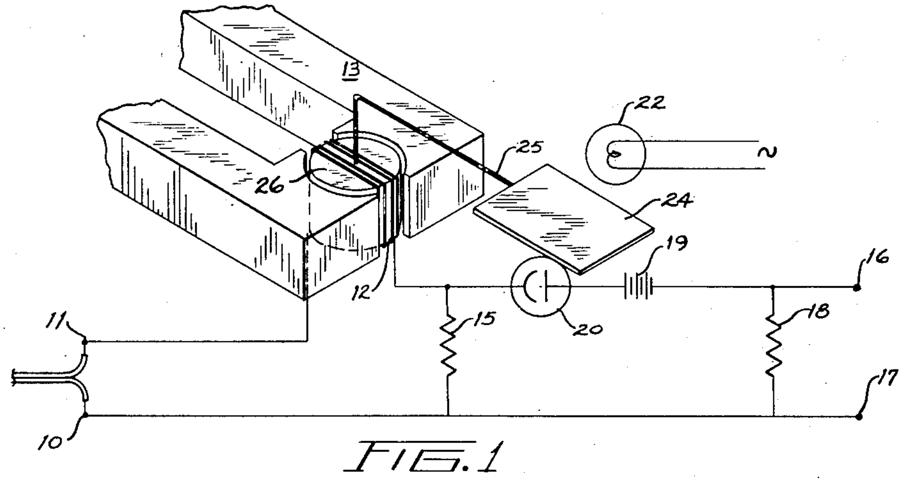
Fig. 1 is a schematic wiring diagram of an amplifier according to the present invention.

Referring now to the drawing wherein like reference characters refer to like parts in the different figures, the amplifier is shown as comprising an input circuit having a pair of input terminals 10 and 11 and which may be traced from terminal 11 through energizing coil 12 of an electromechanical device such as galvanometer 13 and a resistor 15 connected in series, and an output circuit having a pair of output terminals 16 and 17 across which is connected a load resistance 18 and which may be traced from terminal 17 through a source of electromotive power such as a battery 19, photoelectric cell 20 and resistors 15 and 18. A source of light 22 energized from a suitable source of electric power is mounted adjacent to the photoelectric cell 20. Interposed between the light source 22 and the photoelectric cell 20 is an opaque plate or shutter 24 carried by an arm 25 mounted on the movable element 26 of the galvanometer 13. Photoelectric cell 20, light source 22 and shutter 24 are arranged so that no light will strike the cell when the movable element 26 of the galvanometer 13 is in normal or deenergized position.

Assume now that it is desired to amplify a D. C. voltage such as that which appears across the leads of a thermocouple. The positive lead of the thermocouple is connected to terminal 11 and the other lead is connected to terminal 10 and a current proportional to the temperature to which the thermocouple is exposed, will flow through energizing coil 12 of galvanometer 13 and through resistor 15. The movable element 26, and hence shutter 24 will be displaced and will permit light from the light source 22 to strike photoelectric cell 20 thereby causing a current to flow from battery 19 through the cell and through resistances 15 and 18. The current through resistor 15 will develop a potential thereacross of such polarity as to oppose the voltage of the thermocouple thereby reducing the net current flowing through coil 12 of the galvanometer. This in turn will cause shutter 24 to move toward its neutral position and reduce the light permitted to strike the cell 20 and thereby reduce the current in the output circuit until a stable condition is reached when the voltage across resistor 15 is substantially equal to the voltage impressed across the input terminals. Any change in the input voltage will cause a corresponding change in the current in the output circuit.

A voltage drop proportional to the current in the output circuit will appear across load resistor 18. Thus by correctly proportioning the relative values of resistors 15 and 18 any desired amplification may be obtained. As one input terminal and one output terminal are maintained at the same potential, the amplifier will not be subject to zero shift.

Figure 2:
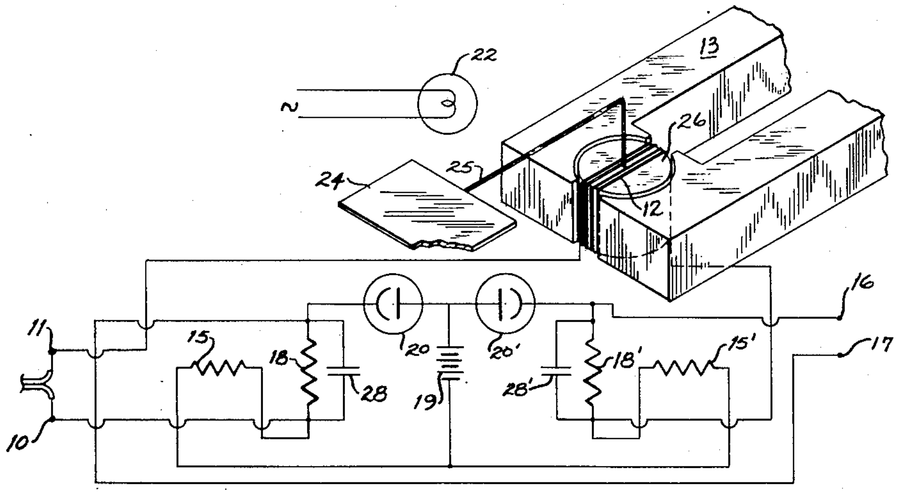
Fig. 2 illustrates a modification of the amplifier shown in Fig. 1.

In order to amplify voltages of both polarities, an arrangement such as shown in Fig. 2 may be used. The amplifier shown in Fig. 2 comprises an input circuit which may be traced from input terminal 11 through coil 12 of galvanometer 13, resistors 15′ and 15 back to input terminal 10, and an output circuit which essentially consists of a pair of output circuits such as shown in Fig. 1 placed back-to-back with the output terminals 16 and 17 connected to the cathodes of photoelectric cells 20 and 20′ respectively. Shutter 24 is either arranged so as to prevent any light from soure 22 from reaching either of the cells 20 or 20′, or it is adjusted so as to permit equal amounts of light to reach the two cells. A higher sensitivity is obtained if some light is permitted to strike both of the cells so that movement of the shutter in either direction will reduce the current flowing through one while increasing the current flowing through the other. Assume now that terminal 11 is driven positive with respect to terminal 10. This will cause a current to flow from terminal 11 through energizing winding 12 of the galvanometer, resistors 15′ and 15 back to input terminal 10 and move shutter 24 to the left as viewed in the drawing. As a result, more light will strike cell 20′ than will strike cell 20 and consequently the current flowing through resistors 18′ and 15′ will increase while the current flowing through resistors 18 and 15 will decrease. It will be noted that the decrease of the potential drop across resistor 15 is of such a polarity as to aid the increased potential drop across resistor 15′ to oppose the voltage impressed across terminals 10 and 11. As explained under the discussion of the operation of the embodiment of Fig. 1, this opposing voltage will cause shutter 24 to seek a position such that the opposing voltage will be approximately equal to the applied voltage. Any change in the applied voltage will cause a corresponding adjustment of the shutter to change the current through the output circuit by a corresponding amount. It will be noted that resistors 18′, 15′ 15 and 18 are connected in series across the output terminals 16 and 17, so that the increase in the voltage across the two first named resistors will be aided by the decrease of the opposite potential of the two last named resistors to provide a push-pull output.

If, in Fig. 2, input terminal 10 should be driven positive with respect to terminal 11, shutter 24 will be forced toward right as viewed in the drawings from its center or neutral position, with the result that the current flowing through resistors 18′ and 15′ will decrease and the current flowing through resistors 15 and 18 will increase causing an output voltage of a polarity opposite to that which appeared across the output terminals when terminal 11 was driven positive.

Thus, if a slowly varying voltage is applied across terminals 10 and 11 a corresponding amplified voltage will appear across the output terminals 16 and 17. The frequency of the varying voltage will of course be limited by the mechanical inertia of the movable element 26 of galvanometer 13 and of shutter 24. The amplification of the amplifier shown in Fig. 2 is determined by the relative values of resistors 15, 15′ and resistors 18, 18′, respectively. In order to dampen the movement of shutter 24 or in other words, to lessen its tendency to overshoot its stable position, condenser 28 and 28′ may be connected in shunt with load resistors 18 and 18′ as shown. This will in no way affect the accuracy of the amplifier but will tend to give it a somewhat sluggish response. For most applications this will not be objectionable.

Figure 3:
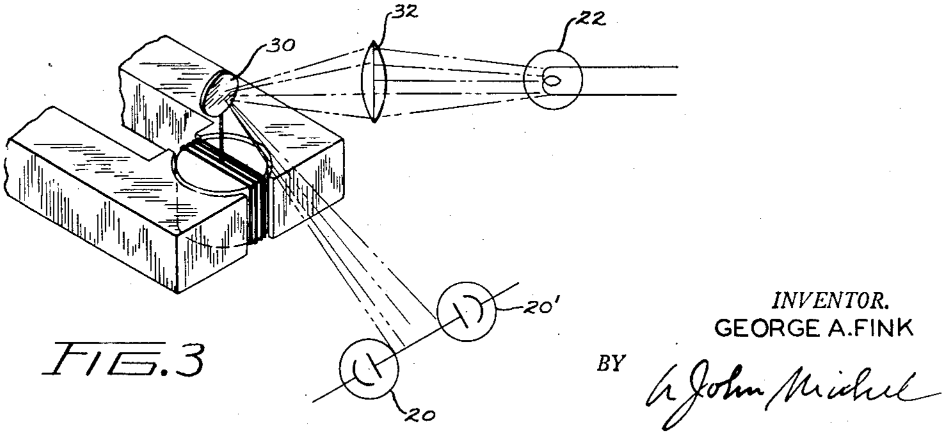
Fig. 3 shows a modification of a portion of the embodiment of Fig. 2.

In order to reduce the inertia of the mechanically moving members of the embodiment shown in Fig. 2, an arrangement such as illustrated in Fig. 3 may be used. Instead of using a shutter arrangement as described above, it may be found more convenient to mount a mirror 30 on the movable element of the galvanometer and focusing rays upon the mirror from source 22 by means of a collecting lens 32. The photoelectric cells 20 and 20′ are then arranged so that the light ray reflected from source 22 will strike a point midway between them. The remainder of the circuit may be as shown in Fig. 2 and has been omitted for the sake of clarity.

An arrangement such as shown in Fig. 2 or 3 has the added advantage that the reference potential may be adjusted by adjusting the position of the shutter or the mirror relative to the movable element of the galvanometer.

Although only two embodiments of the invention have been illustrated and described in detail, it is to be understood that the invention is not limited thereto as various changes may be made in the design and the arrangement of parts without departing from the spirit and scope of the invention as defined in the appended claims.

What is claimed is:

1. An amplifier having a pair of input terminals and a pair of output terminals comprising in combination, a source of electromagnetic radiation; unidirectional impedance means variable in accordance with the amount of electromagnetic radiation striking one surface thereof mounted adjacent to said source; an output circuit including in series relation said variable impedance means, load resistance means connected across said output terminals, a second impedance and a source of electromotive power; a shutter normally interposed between said source of electromagnetic radiation and said variable impedance means; electromechanical means adapted to displace said shutter and an input circuit including said input terminals and said second impedance and means for actuating said electromechanical means in response to a signal applied across said input terminals to displace said shutter by an amount proportional to a signal voltage applied across said input terminals to permit electromagnetic radiation from the radiation source to strike the variable impedance means to vary the impedance thereof to permit current flow in the output circuit in such a direction as to develop a voltage across said second impedance to oppose the applied voltage thereby causing said shutter to seek a position such that the current flow in the output circuit is proportional to the input signal voltage.

2. An amplifier comprising in combination an input circuit including a pair of inpue terminals and a resistance connected in series therewith; an output circuit comprising a pair of output terminals, a load resistance connected across said output terminals, a source of electromotive power, photoelectric means and said first named resistance connected in series relation; a source of electromagnetic radiation mounted in spaced relationship with respect to said photoelectric means, shutter means interposed between said source of electromagnetic radiation and said photoelectric means and means responsive to the current in said input circuit adapted to actuate said shutter means to vary the amount of radiation striking said photoelectric means from said source of radiation, the shutter means seeking a stable position when a signal voltage is applied across said input terminals such that just sufficient current is caused to flow through said output circuit to develop a voltage across said first named resistance substantially equal to the applied signal voltage.

3. An amplifier for direct currents comprising in combination an electromechanical device, an energizing winding for said device, a pair of input terminals, an input circuit including said input terminals and said energizing winding, a pair of output terminals, a load resistor connected across said output terminals, a photoelectric device, a source of electromotive power, an output circuit including in series relationship said load resistance, said power source and said photoelectric means and a resistance common to the input circuit and the outlet circuit, a source of light mounted adjacent to said photoelectric means, shutter means interposed between said source of light and said photoelectric means and adapted to be positioned by said electromechanical device in response to current flowing through said energizing winding thereof, the photoelectric means being so connected and the electromotive source being so poled as to cause a current to flow through said output circuit and through said common resistance in such a direction as to develop a voltage across said common resistance in opposition to the voltage applied across the input terminals whereby said shutter will seek a position such that just sufficient voltage will be developed across said common resistor due to current flowing through the input circuit due to the applied signal voltage sufficiently to maintain said shutter in such position.

4. An amplifier for D. C. and very low frequency A. C. voltages comprising in combination an input circuit including a pair of input terminals, an electromechanical device responsive to currents in said input circuit, an output circuit including a pair of output terminals and a pair of complementary circuits connected between said output terminals; each of said complementary circuits comprising a photoelectric cell, a source of electromotive power, a load impedance and a dropping resistor; said dropping resistors being included in the input circuit in series relation, said photoelectric cells being mounted in spaced relationship, a source of electromagnetic radiation, a shutter interposed between said radiation source and said cells and normally adjusted so as to permit sufficient radiation from said source of radiation to strike said cells to cause equal and opposite currents to flow through said complementary circuits, said electromechanical device including means to position said shutter in response to currents in said input circuit in such a manner that the shutter will seek a position such that the currents flowing through said photoelectric cells, said complementary circuits and said dropping resistors are just sufficient to develop a voltage across said dropping resistors in opposition to a signal voltage applied across said input terminals to reduce the current flowing through said input circuit due to said applied voltage to a value where stability of said shutter is achieved.

5. An amplifier for D. C. and very low frequency A. C. signals comprising in combination an input circuit including a pair of input terminals, an output circuit including a pair of complementary circuits connected in pushpull relationship and a pair of output terminals across said complementary circuits; each complementary circuit comprising a photoelectric cell, a source of electromotive power and a pair of resistances; one resistance of each complementary circuit being connected in series and included in the input circuit, said cells being mounted in spaced relationship, a source of electromagnetic radiation, means responsive to the current in the input circuit for varying inversely the amount of radiation striking said cells from said radiation source and consequently varying inversely the currents in the complementary circuits in response to a voltage applied across the input terminals and means for causing the total voltage drop across said series connected one resistance of each complementary circuit to oppose and substantially balance the voltage applied across the input terminals.

6. An amplifier according to claim 5, in which a capacitance is connected across that resistance of each of said pairs of resistances, which is not included in the input circuit.

GEORGE A. FINK.

References Cited in the file of this patent

UNITED STATES PATENTS

| Number | Name | Date |
|---|---|---|
| 2,127,845 | Ryder | Aug. 23, 1938 |
| 2,136,682 | Gilbert | Nov. 15, 1938 |
| 2,183,606 | Day | Dec. 19, 1939 |
| 2,216,301 | Sparrow | Oct. 1, 1940 |
| 2,237,950 | Pineo | Apr. 8, 1941 |
| 2,547,662 | Rich et al. | Apr. 3, 1951 |
| 2,567,276 | Dicke | Sept. 11, 1951 |